Sept. 5, 1950 W. B. BLANTON ET AL 2,520,903

AUTOMATIC TELEGRAPH SWITCHING SYSTEM

Filed June 20, 1946 5 Sheets-Sheet 1

INVENTORS
W. B. BLANTON
R. C. AYERS
BY M. R. Marsh
ATTORNEY

Sept. 5, 1950 W. B. BLANTON ET AL 2,520,903

AUTOMATIC TELEGRAPH SWITCHING SYSTEM

Filed June 20, 1946 5 Sheets-Sheet 2

INVENTORS
W. B. BLANTON
R. C. AYERS
BY M. R. Marsh
ATTORNEY

AUTOMATIC TELEGRAPH SWITCHING SYSTEM

Filed June 20, 1946 5 Sheets-Sheet 3

INVENTORS
W. B. BLANTON
R. C. AYERS
BY M. R. Marsh
ATTORNEY

Sept. 5, 1950 W. B. BLANTON ET AL 2,520,903

AUTOMATIC TELEGRAPH SWITCHING SYSTEM

Filed June 20, 1946 5 Sheets-Sheet 4

INVENTORS
W. B. BLANTON
R. C. AYERS
BY M. R. Marsh
ATTORNEY

INVENTORS
W. B. BLANTON
R. C. AYERS
BY M. R. Marsh
ATTORNEY

Patented Sept. 5, 1950 2,520,903

UNITED STATES PATENT OFFICE 2,520,903

AUTOMATIC TELEGRAPH SWITCHING SYSTEM

William B. Blanton, Rockville Centre, and Robert C. Ayers, Valley Stream, N. Y., assignors to The Western Union Telegraph Company, New York, N. Y., a corporation of New York Application June 20, 1946, Serial No. 677,964

8 Claims. (Cl. 178—3)

Figure 1:
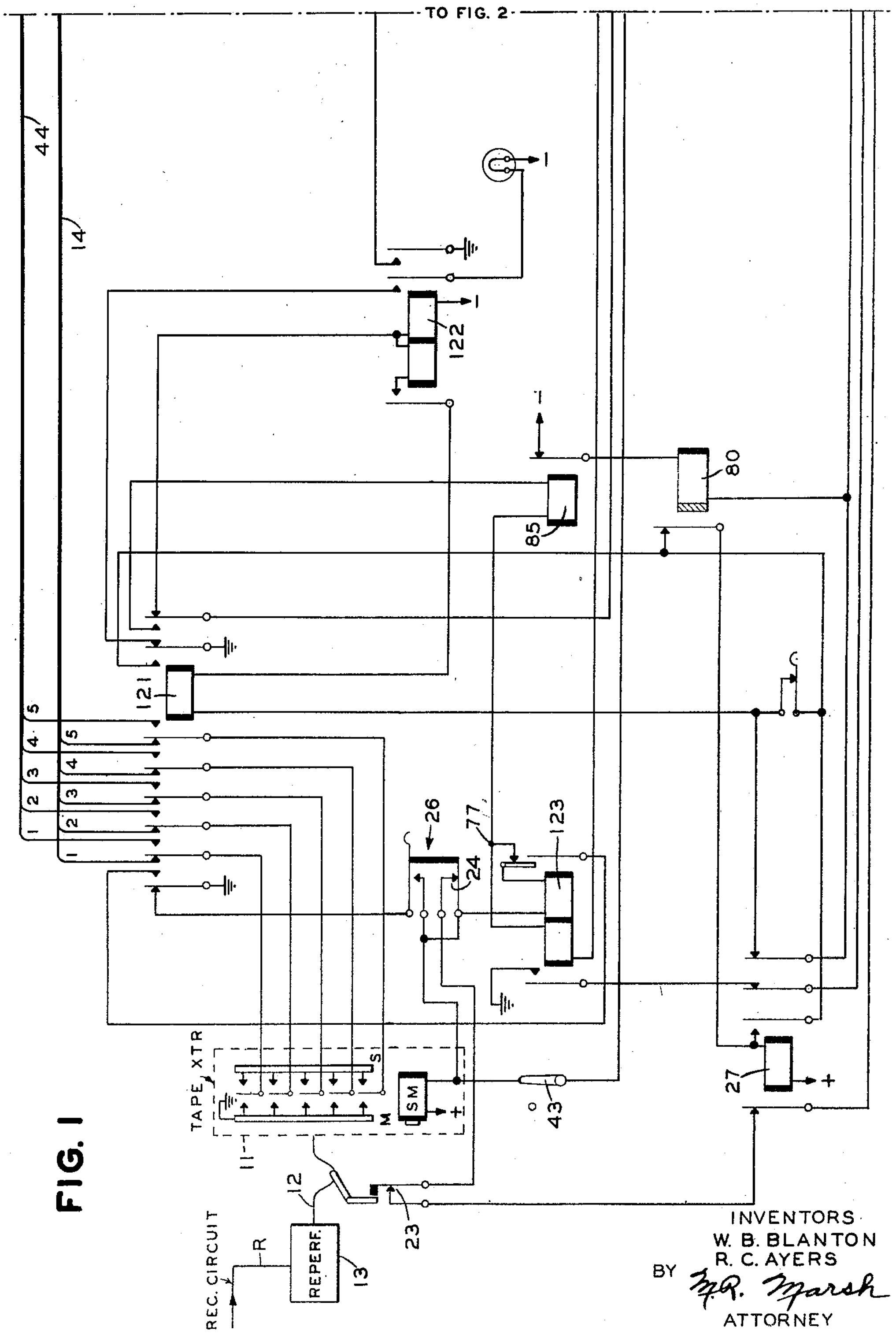

This invention relates primarily to telegraph switching systems and, more particularly, to reperforator switching systems wherein telegraph messages received, or originating at, a switching center are stored in a perforated tape incident to the relaying and subsequent retransmission thereof to a selected outgoing circuit.

The invention is hereinafter described as being applied to what is known as a double reperforation switching system, wherein each receiving circuit at a switching center terminates in and controls a so-called receiving reperforator which perforates a paper tape in accordance with received signals whereby the signals are stored a first time. Each such reperforator has individually associated therewith a tape transmitter which is operative to transmit code signals representative of those stored in its associated paper tape. By means of plugs and jacks in prior art systems, the sending circuit of such transmitters are extended to selected ones of a plurality of so-called sending position circuits where these signals operate another reperforator, called an intra-office or sending position reperforator, whereby the signals are again stored in a paper tape adapted to control a second or sending position transmitter for transmitting such signals to the sending circuit. Patent No. 2,279,295, granted to W. B. Blanton, April 14, 1942, describes a system of this type in detail and reference is made to this patent for a description of certain details of the system disclosed herein.

Although the present invention is hereinafter described as being applied to a system such as that described in the Blanton patent wherein a double reperforation system is shown, it will be apparent that the present invention is not limited in application to this particular system or this particular type of system but that the principles of the present invention may be applied to various other types of telegraph exchange systems, such as, for example, those wherein single storage is employed. In a single storage exchange system, the transmitter associated with the reperforator terminating a receiving circuit is adapted to transmit directly to a sending circuit.

In the present invention, the selection of a desired sending position circuit is effected automatically under the control of a directing signal perforated in the tape preceding a message, rather than by means of plugs and jacks as is the case in the above-mentioned Blanton patent.

One of the main objects and features of the invention is to provide a semi-automatic telegraph switching system more efficient in operation in that it requires a minimum of an attendant's time and effort incident to the relaying of a message through a switching center but which is at all time under full control of the attendant.

Another object of the invention resides in the provision of a system which is semi-automatic in operation wherein the selection of an outgoing circuit is effected under the control of directing signals preceding each message and the initiation of the switching of messages is controlled manually. In this connection, another feature of the invention resides in the provision of means for switching one message at a time from an intra-office circuit to the automatically selected sending position circuit in response to the individual actuations of a manually operable element and in automatically switching all messages that may be stored in a tape to their respective sending position circuits, incident to a single actuation of another manually operable element.

Still another feature of the invention resides in the provision of means for manually controlling the selection of the desired outgoing circuit in the event of the absence of a directing character or group of characters preceding a message which is to be switched.

Still another feature of the invention resides in the provision of means whereby the directing character preceding a message may or may not be deleted from the message as it is relayed through the switching center.

The above and further features and objects of the invention will be more apparent hereafter in the accompanying detailed description and drawings, in the latter of which—

Figure 2:
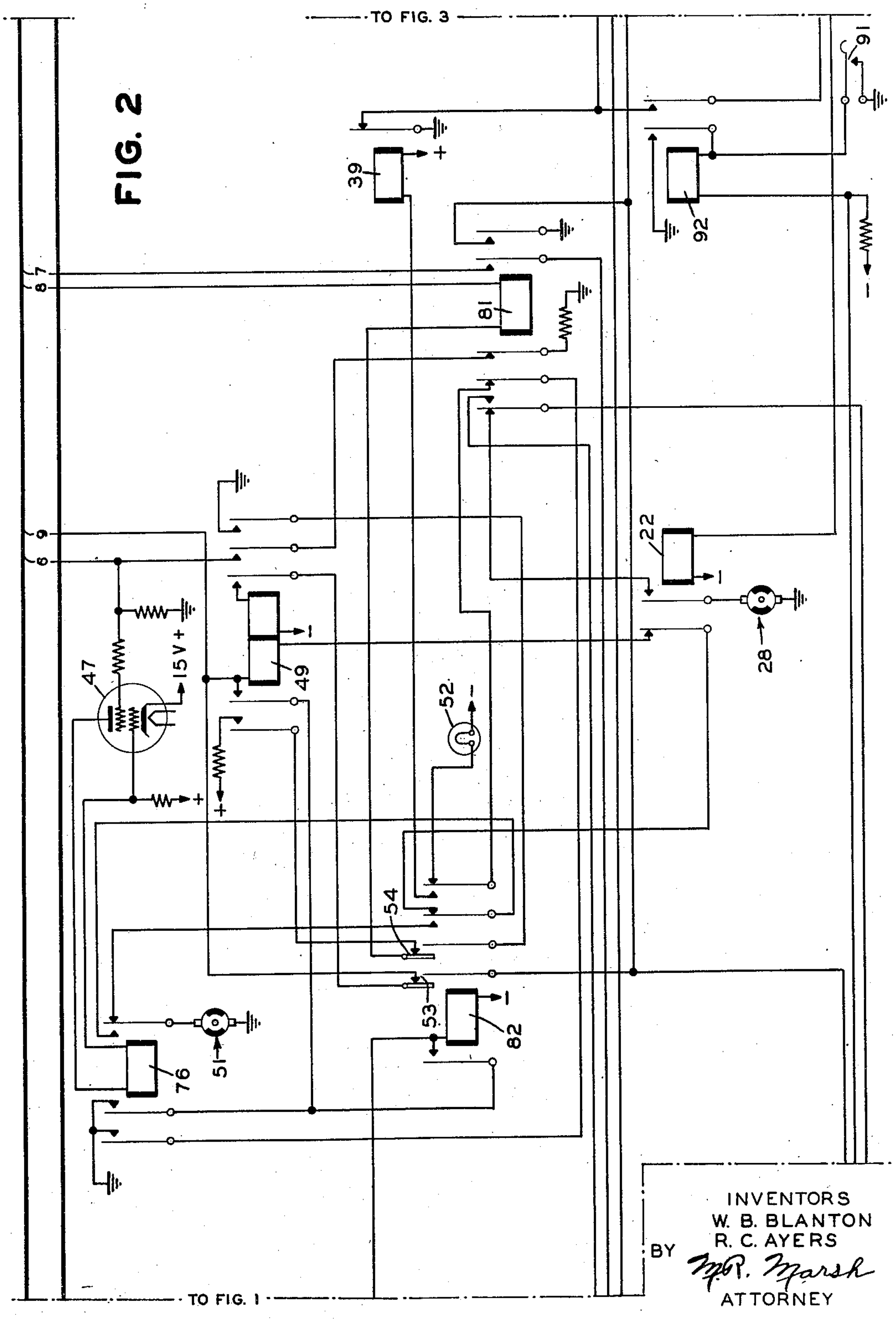
Figure 3:
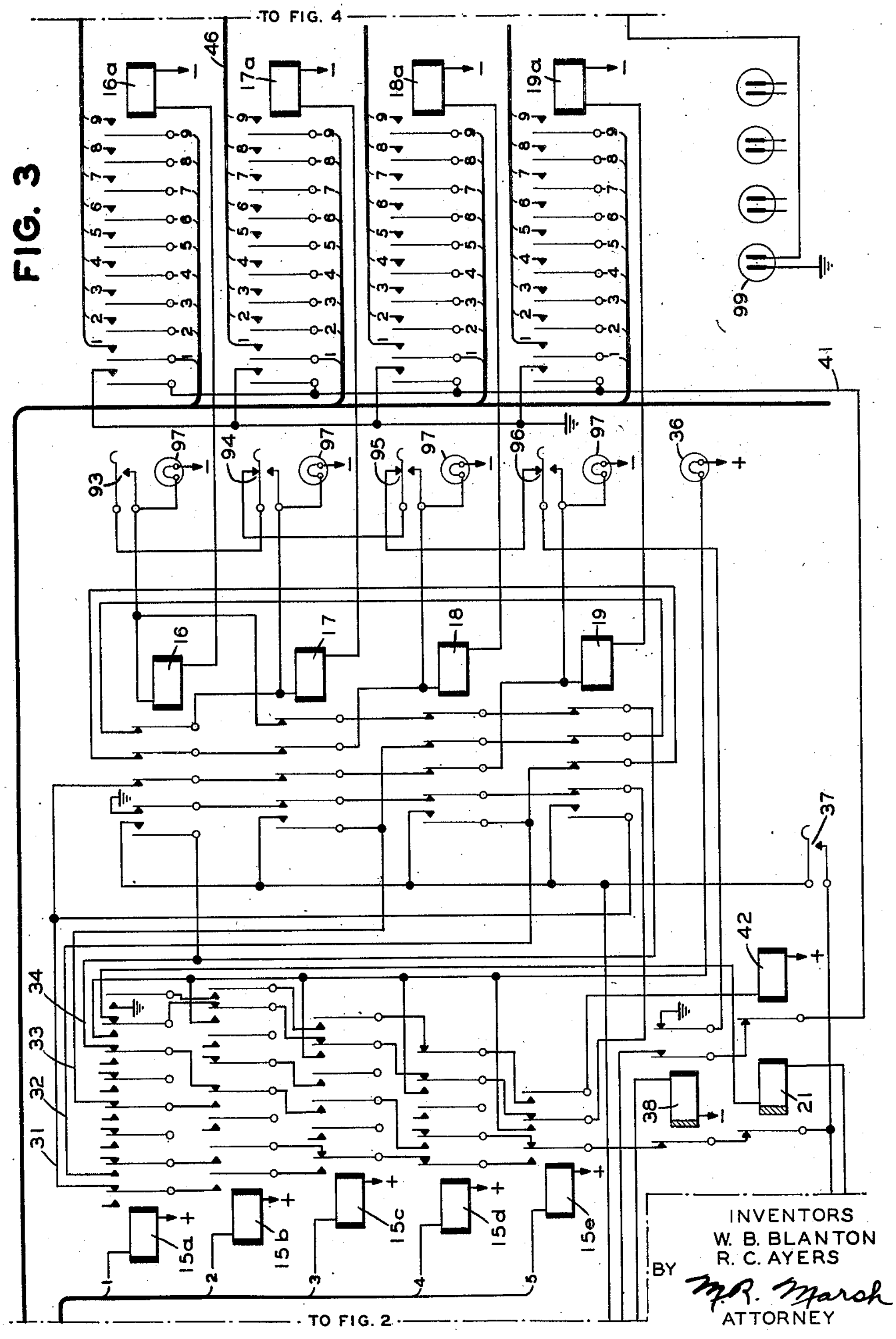
Figure 4:
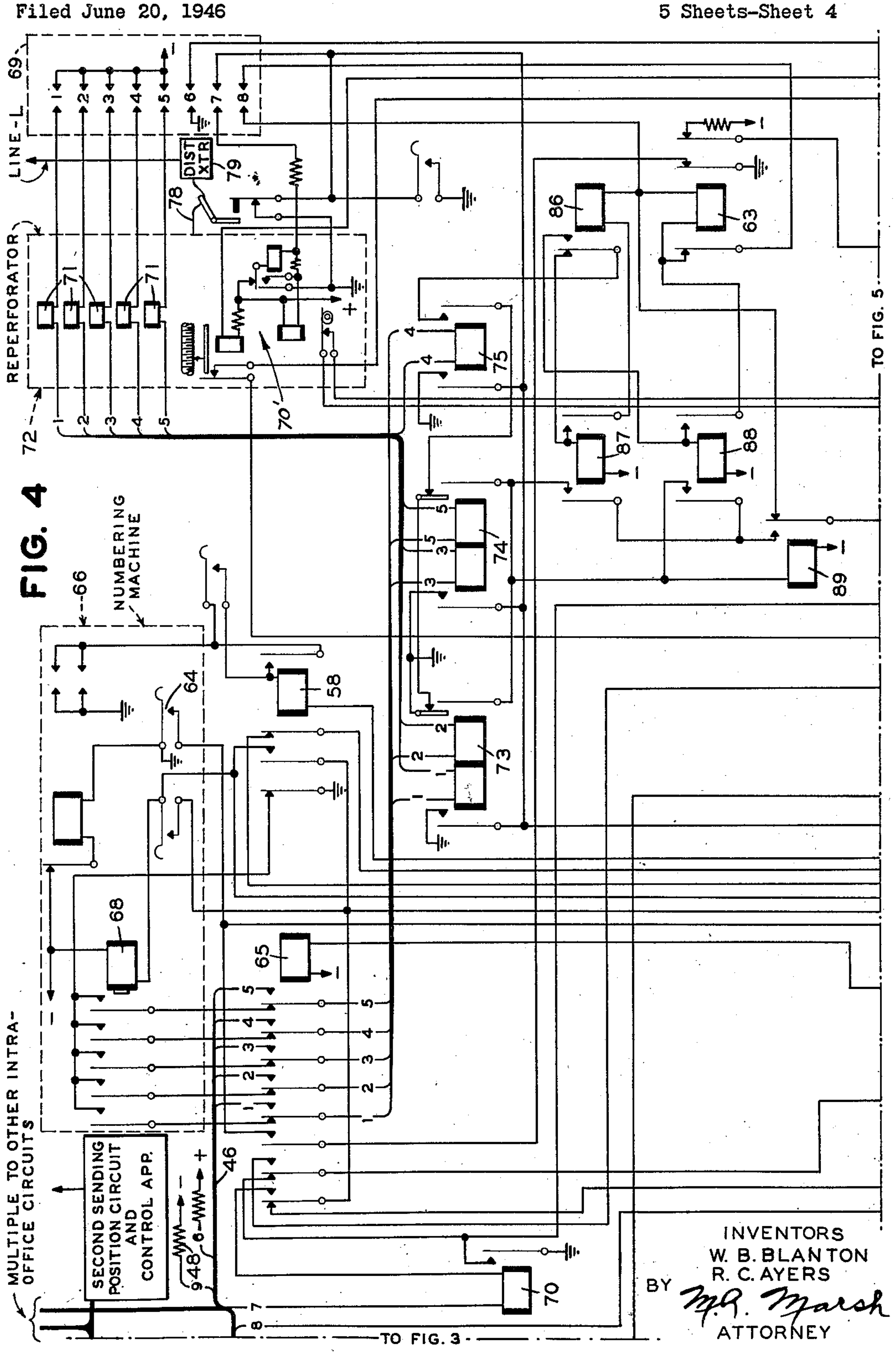
Figures 5, 6:
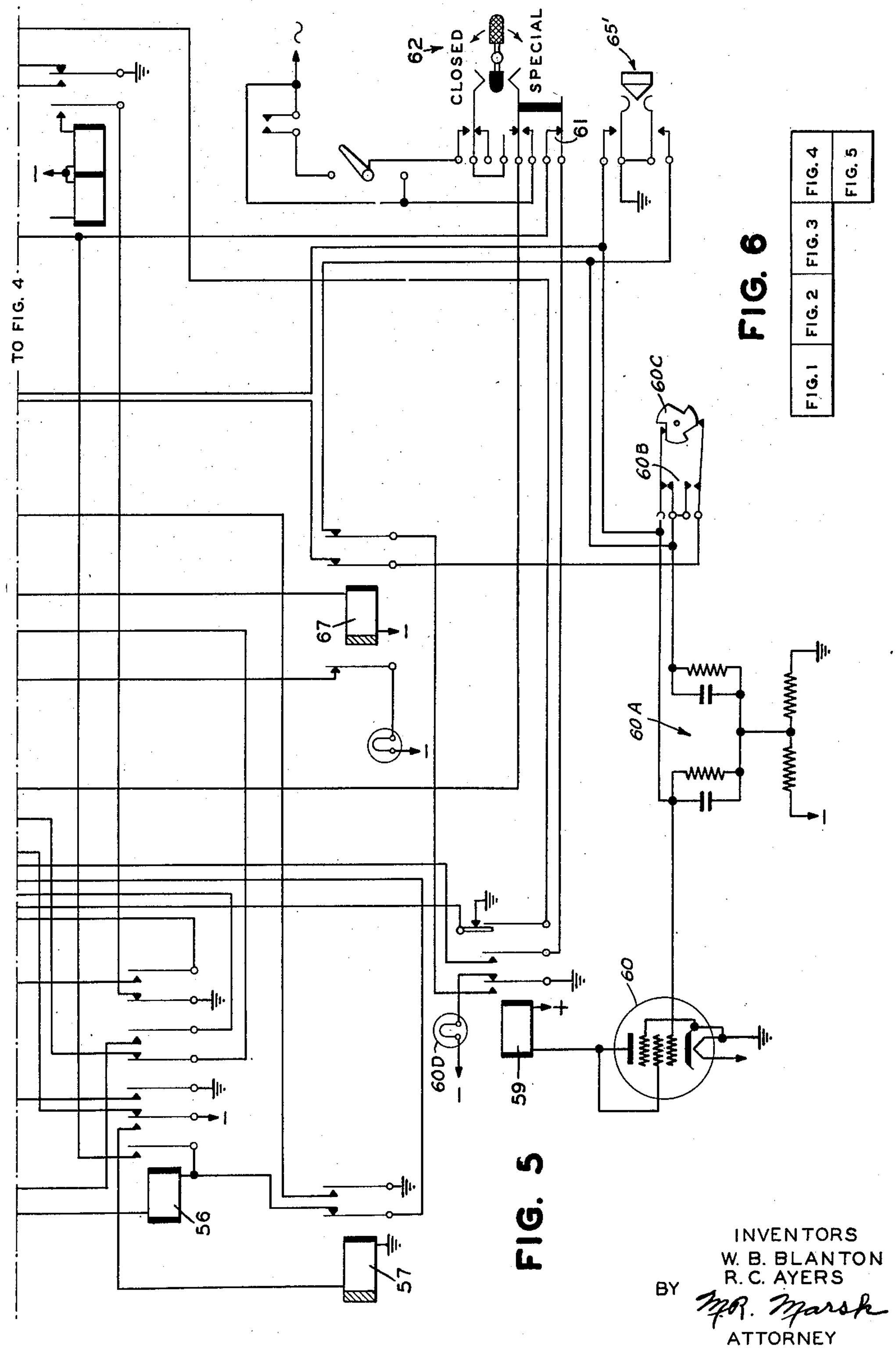

Figs. 1, 2 and 3 together represent diagrammatically an intra-office circuit;

Figs. 4 and 5 together represent diagrammatically a sending position circuit; and Fig. 6 illustrates the manner in which Figs. 1 to 5 may fit together to form a complete circuit.

The intra-office circuit of Figs. 1, 2 and 3 includes a tape transmitter 11 adapted to operate under the control of a perforated tape 12. The tape 12 is prepared, in the embodiment of the invention shown, by a reperforator 13 controlled by signals received over a receiving circuit R. However, the perforating tape 12 could as well be prepared by an operator at a local sending position at the switching center in which case a keyboard perforator would be substituted for the reperforator 13.

If it is assumed that the tape 12 between the reperforator 13 and transmitter 11 has no message stored therein and contains nothing but blanks, which is the perforation sometimes employed in the present system to separate the messages and enables the last message character in the tape to reach the sensing pins of the transmitter, the tongues of the transmitter will be in contact with their spacing stops. These tongues are connected by individual conductors through tongues and back contacts of a relay 121 and a cable 14 through the coils of respective so-called pulse relays 15*a* to 15*e* to potential. With a blank in the tape over the pins of the transmitter, relays 15*a* to 15*e* will all be deenergized to complete a circuit from ground through back contacts and tongues of line switching relays 16, 17, 18, and 19, and pulse relays 15*e*, 15*d*, 15*c*, 15*b*, and 15*a*, and the coils of relays 21 and 22 to potential. Accordingly, relays 21 and 22 will be energized for the assumed condition.

When the perforator 13 begins to store a message in the tape 12, the extra supply of tape will permit the tape lever contacts 23 to close whereupon a circuit from potential through the coil of the step magnet SM of the tape transmitter 11, the lower contacts 24 of a key switch 26, tape lever contacts 23, the back contact and left-hand tongue of relay 27, the outer left-hand tongue and back contact of relay 81, the make contact and inner tongue of relay 22 and a pulse generator 28 to ground. Pulses from the generator 28 are thereby effective to periodically energize step magnet SM of the tape transmitter whereby the tape 12 is advanced one step for each energization thereof and as long as blanks appear over the sensing pins of the transmitter and contacts 23 remain closed the above tape stepping circuit is maintained. However, when the first character of a message appears over the sensing pins which in this case will be the message directing character, one or more of the relays 15*a* to 15*e* will be energized to interrupt the circuit to the relay 22 whereupon the said relay will release and interrupt the described circuit to the step magnet SM.

In the following description of the intra-office circuit, the above-mentioned relays 121 and 81, together with hereinafter-mentioned relays 76, 82, 122 and 123 operate in substantially the same manner and are for the same purposes as relays having these same reference numerals in Fig. 2 of the above-mentioned Blanton patent.

Some of the tongues of the relays 15*a* to 15*e* are arranged in a fan circuit in such a manner that various circuit paths, one at a time, are completed therethrough when the relays are operated in different combinations. Four such circuit paths are shown in the drawings extending to four conductors 31, 32, 33 and 34. Each of the conductors 31 to 34 extend one of the circuit paths established by the fan circuit through a back contact and tongue of three of the relays 16 to 19 and through the coil of the other one of the relays 16 to 19 in series with a corresponding coil of relays 16*a* to 19*a* to potential. Thus when a circuit path is completed through the fan circuit to any one of the conductors 31 to 34, the circuit will be extended through the coils of one of the pairs of relays to potential provided each of the other relays of the set 16 to 19 are deenergized. For example, should the relays 15*a* to 15*e* be operated in such a combination as to establish a circuit path through the fan circuit thereof to conductor 33, relay pair 17 and 17*a* will be conditioned for operation provided relays 16, 18 and 19 are deenergized.

In addition to the functions set forth above which include the partial establishment of a circuit for operating one of the pairs of relays 16 to 19 and 16*a* to 19*a*, the operation of one or more of the relays 15*a* to 15*e* establishes a circuit for the operation of a so-called "Connection Request" lamp 36 to inform the attendant that the message or at least the first part thereof has appeared in the storage tape 12. The circuit to the "Connection Request" lamp 36 may be traced from potential through the lamp, a front contact and tongue of an operated one of the pulse relays 15*a* to 15*e* and a back contact and tongue of all relays 15*a* to 15*e* below the operated one, through the four tongues and back contacts of relays 16 to 19 in series to ground.

The attendant upon seeing the lamp 36 illuminated may then operate the "Single Message" start key 37 to apply a ground to the circuit established through the coils of relays 17 and 17*a* and including conductor 33 and contacts of relays 15*a* to 15*e* operated in accordance with the directing character preceding the message. The ground applied to the above circuit extends through back contacts and tongues of relays 21 and 38 and originates at the back contact and tongue of a disconnect relay 39. The above circuit for operating relays 17 and 17*a* is not completed until the slow-to-release relay 21 has released, which insures that the tongues of the relays 15*a* to 15*e* will have settled down and thus eliminate the possibility of a false selection. When one of the line relays, such as 17, operates, it and its companion one of a pair which in this case will be relay 17*a*, lock up from the ground at the disconnect relay 39 through the front contact and outer tongue of the operated line switching relay, such as 17, independently of the key 37 and contacts of relays 15*a* to 15*e*, 21 and 38.

The operation of one of the line switching relays, such as relay 17*a*, completes a circuit from ground through the front contact and outer tongue thereof to conductor 41 and thence through a tongue and back contact of relay 42, the right-hand tongue and back contact of relay 38, a switch 43 and the coil of the step magnet SM of the tape transmitter 11 to potential. If the switch 43 is closed at this time, the grounding of the above circuit by the operation of relay 17*a* will effect energization of the step magnet SM. As will be described hereinafter, the operation of relay 81 just prior to the transmission of the message will cause relay 38 to operate. The inner right-hand contacts of relay 38 will open the circuit to the step magnet SM and cause the directing character over the pins of the tape transmitter to be stepped out of association therewith. Such operation of the step magnet SM of the transmitter 11 occurs before the transmitter starts transmitting to the sending circuit and hence the directing character will not be transmitted to the sending circuit. However, if the operating procedure is such and the particular sending circuit to which the messages are to be relayed have further use for the directing character of the message in the tape, the switch 43 may be opened or left open and consequently the operation of any one of the relays, such as 16*a* to 19*a* will not effect advancement of the tape and the tape transmitter 11 as is the case with switch 43 closed.

In addition to the above, the operation of one of the relays, such as 17*a*, extends the nine conductors of cable 44 to cable 46. The nine conductors of cable 44 are multiplied to the nine inner tongues of all the relays 16a to 19a and the nine conductors of cable 46 are multiplied to corresponding contacts of one of the relays, such as 17a, of all the intra-office circuits included in the system. With respect to the nine conductors of cables 44 and 46, the operation of the relays, such as 17a, corresponds to the insertion of the plug P, Fig. 2 of the abovementioned Blanton patent into a jack, such as 14.

The No. 6 conductor of cable 46 terminates in positive potential and the operation of relay 17a completes a circuit from this positive potential to a control grid of a vacuum tube 47, causing said vacuum tube to pass current and effect energization of relay 76 in the plate circuit thereof. Concomitantly the operation of relay 17a completes a circuit from negative potential through a resistance 48 and the ninth conductor of cables 46 and 44, the left-hand coil of a relay 49, back contacts and tongues of relays 22 and 82 to a front contact of relay 76, the associated tongue of which is connected through an allotter 51 to ground. The allotter 51 is common to all the intra-office circuits of the system and sequentially applies ground to the right-hand tongues of relays 76 of these circuits to cause operation of relay 49 if the sending position circuit is idle at the time of operation of a line relay, such as 17a. Relay 49 in operating through its inner left-hand tongue places a ground on the No. 9 conductor of cable 46 and thus prevents the operation of relay 49 of any other intra-office circuit, and hence another intra-office circuit cannot be connected to a busy sending position circuit. However, the operation of a relay 76 through its preliminary make contacts of the inner right hand tongue registers a connection, and on the release of the sending position circuit by the connected intra-office circuit, a second intra-office circuit having an operated relay 76 will be automatically connected thereto.

The operation of relay 76, as above described, through an obvious circuit including a tongue of front contact thereof and a tongue and back contact of relay 81 and 82 effects illumination of the "Standby" lamp 52 and when relay 49 operates, it locks up through a circuit including its right-hand coil and contacts 53 of relay 82.

As relay 49 operates, it completes a circuit from positive potential through the front contact and outer left-hand tongue thereof, contacts 54 associated with the second right-hand tongue of relay 82, the coil of relay 81, the eighth conductor of cable 44, a tongue and front contact of relay 17a, the eighth conductor of cable 46, the coil of relay 56, back contacts and tongues of relays 57 and 58, a front tongue of a normally operated relay 59, the lower contacts 61 of a "close-out" switch 62 and a tongue and back contact of a relay 63 to negative potential. This circuit effects operation of relays 81 and 56 and the former in operating removes the ground from the circuit to the "Standby" lamp 52 whereby the said lamp ceases to be illuminated and indicates that a connection has been made from the intra-office circuit to a sending position circuit. Also, the operation of relay 81, which is sometimes referred to as the seize relay, through its outer right-hand tongue completes a circuit for operating relay 38 and prepares a locking circuit for holding relays 121 and 122 operated when a circuit is completed thereto in the manner set forth hereinafter. In addition to the above, the operation of relay 81 prepares a circuit for the operation of the step magnet SM of the tape transmitter 11. Relay 59 is held operated by plate current flowing through vacuum tube 60 which is controlled by a condenser resistance timing circuit 60A in conjunction with contacts 60B operated by a tape reel cam 60C. The tape reel cam 60C is rotated by advancement of the paper tape 78 through the reperforator 72 and as long as the tape feeds properly vacuum tube 60 passes plate current to maintain relay 59 operated. However, should the tape of the reperforator be tied up or fail to feed properly the tape tie-up control circuit effects release of relay 59 to interrupt the circuits controlled by the energization thereof and effects illumination of the tape tie-up illuminating lamp 60D. The operation of the tape tie-up reset button 65' after remedying a tape tie-up condition restores the tape tie-up circuit to its normal condition.

As relay 56 of the sending position circuit, shown in Figs. 4 and 5, operates it performs the following functions: (1) establishes a holding circuit for itself and relay 81 which is independent of contacts of relays 57, 58 and 59 and contacts 61 of the "close-out" key 62; (2) removes negative potential at its second right-hand tongue from the circuit leading to the coil of relay 58 so that this relay cannot be operated while the sending position circuit is busy or while it is seized by an intra-office circuit; (3) completes a circuit for the operation of relay 57; (4) prepares, through its outer right-hand tongue, a circuit for the operation of a transfer relay 65 which at this time will be open at switch contacts 64 included in the numbering machine 66; (5) through its third right-hand tongue and front contact applies ground to a circuit including a tongue and back contact of relay 65 and the coil of relay 67 to potential whereby relay 67 is operated; (6) completes a circuit from negative potential through the coil of operating magnet 68 of the numbering machine 66, the fifth right-hand tongue and front contact of relay 56, the back contact and outer tongue of relay 65, the front contact and outer tongue of relay 59 to the one terminal of the No. 6 contacts of the impulse unit 69, the other contact of which is grounded. Thus, for the time being, on each closure of the No. 6 contacts of the continuously operating impulse unit 69, the operating magnet 68 of the numbering machine will be energized.

The first five sets of contacts of the impulse unit 69 have one terminal thereof connected to potential and the other terminals extend through selecting magnets 71 of the sending position circuit reperforator 72 and individual coils of reading relays 73, 74 and 75, in the manner shown, to the five inner tongues of relay 65. The corresponding back contacts of relay 65 extend to operating contacts of the numbering machine 66 which in the manner well known in the art are operated for a predetermined number of operations to represent the signals which it is desired to perforate in the tape of the sending position circuit reperforator 72 ahead of the message to be stored therein. The signals or code groups transmitted from the numbering machine 66 normally include signals representing consecutive numerals along with other circuit identifying signals. The reperforator 72 in the preferred embodiment includes a tape feed-out mechanism of the type well known in the art and such a mechanism is indicated generally by reference numerals 70'. The tape feed-out mechanism 70' may operate to feed out a predetermined length of tape on the cessation of signals and a taut tape condition to permit the last perforated signal character in the tape to reach the transmitter or the tape feed-out mechanism may be initiated into operation at other times such as at the end of a message to permit the last message character to meet the transmitter.

When the numbering machine 66 completes its sequence of operation, contacts 64 thereof close and complete a circuit through the outer tongue and front contact of relay 56 and the coil of relay 65 to potential, whereby relay 65 operates. Relay 65 in operating transfers the circuits to the selecting magnets 71 of the reperforator 72 to five conductors of cable 46 which extend through front contacts and tongues of relay 17a and cable 44 to front contacts of the first five left-hand tongues of relay 121. Relay 121 is, at this time, deenergized.

In addition to the above, the operation of relay 65 by its outer tongue interrupts the operating circuit from the No. 6 contacts of the impulse unit 69 to the operating magnet 68 of the numbering machine 66 and transfers this circuit through a front contact of relay 65, the coil of relay 70, the seventh conductor of cable 46, a front contact and tongue of relay 17a, the seventh conductor of cable 44, the front contact and inner right-hand tongue of relay 81, the outer right-hand tongue and back contact of relay 121 and the right-hand coil of relay 122 to potential. This causes energization of relay 122 which is a pulse absorbing relay, and the operation thereof extends the above circuit through the left-hand coil of relay 122, the coil of relay 121, a back contact and tongue of relay 27, the front contact and outer right-hand tongue of relay 81 to ground. There is no current through the coil of relay 121 or the left-hand coil of relay 122 while the No. 6 contacts are closed as these contacts short-circuit these two windings. When the No. 6 contacts open, the short-circuit is removed and relay 121 operates. Operation of relay 122 also establishes an obvious circuit through the coil of relay 82 which becomes energized and locks up from ground through a tongue and front contact of relay 76.

As relay 121 operates, it switches the five conductors of cable 44 to the five tongues of the tape transmitter 11 and this occurs at the proper time to cause the perforation in the tape 12 over the pins of the transmitter 11 to be transmitted to the reperforator 72 on the following closure of the first five contacts of the impulse unit 69. By its outer right-hand tongue, relay 121 transfers the circuit which effected operation of relay 122 through the coil or relay 85 to the point 77 where the current divides, half going through the right-hand coil of relay 123 to the step magnet SM of the tape transmitter and the other half going through the left-hand coil of relay 123, a front contact and tongue of relay 81, a tongue and back contact of relay 27, the tape lever contacts 23, the contacts 24 of key switch 26 to the step magnet. Thus for each subsequent closure of the No. 6 contacts of the impulse unit 69 an operating pulse is provided for the step magnet SM of the transmitter 11 to advance the tape therein in conjunction with the closure of the first five contacts of the impulse unit to cause the characters in the tape 12 of transmitter 11 to be reperforated in the tape 78 issuing from the reperforator 72. This circuit to the step magnet SM is maintained as long as the tape lever contacts 23 remained closed and the relay 27 remains deenergized. Relay 27 is operated when a tape tie-up at the reperforator 72 occurs. Thus, a message appearing in the tape 12 is relayed through the intra-office circuit of Figs. 1, 2 and 3 to a reperforator 72 in the desired sending position circuit, Figs. 4 and 5, and is reperforated in the tape 78 thereat. The tape 78 in the manner well known controls the operation of a distributor transmitter 79 operative to transmit signals stored in the tape 78 to a sending line L.

The messages in the tape 12 are separated by end-of-message signals and the transmission of such a signal from the transmitter 11 is effective to stop operation thereof so that the transmitting circuit from the tape transmitter 11 may be switched to the same or another sending position circuit depending upon the destination of the following message. In the embodiment of the invention disclosed the end-of-message signal consists of a double period and these combinations like all other characters of the message transmitted from the transmitter 11 cause some or all of relays 73, 74 and 75 to be operated in accordance therewith. When a period is sent from the transmitter 11 only relay 75 of the above three operate and it, through a front contact thereof, applies a ground through contacts of relays 73 and 74, a back contact of relay 86 through the coil of a relay 87 to potential. This first period, therefore, effects energization of relay 87 and as relay 75 releases, relay 86 operates to transfer the circuit which operated relay 87 to relay 88. If the next succeeding character is also a period, the second operation of relay 75 will effect operation of relay 88 and as relay 75 releases a second time, relay 63 operates. The operation of relays 63, 86, 87 and 88 in the above manner in response to an end-of-message signal is similar to the operation of corresponding relays in the above-mentioned Blanton patent. The operation of relay 63 is timed by the operation of the No. 8 set of contacts of the impulse unit 69, and the interposition of any character other than a blank between the two periods of the end-of-message signal through an obvious circuit effects energization of relay 89, whereby the holding circuit to relays 86 and 87 which operated in response to the first period is interrupted.

The operation of relay 63 in response to the end-of-message signal, through its inner right-hand tongue, removes the holding ground applied through a tongue and front contact of relay 65, a tongue and front contact of relay 56 to the coil of relay 65 whereupon relay 65 releases. Also, operation of relay 63 through its outer right-hand tongue removes the negative potential from the circuit extending through the coils of relay 56 and 81 whereupon these relays also release. Release of relay 65 disconnects the transmitter 11 from the sending reperforator 72 of the sending position circuit, while release of relay 81 effects energization of the disconnect relay 39 and the release of various other relays of the intra-office circuit.

As relay 39 operates it removes ground from the circuit holding relays 17 and 17a operated whereupon the said relays release. The release of relay 17a is the equivalent of withdrawing the plug from a jack in the above-mentioned Blanton patent while relay 17 in releasing restores the circuits through back contacts and tongues thereof to normal. If the perforation over the pins of the transmitter 11 is at this time a blank, relays 15a to 15e will be deenergized and the circuit through the coils of relays 21 and 22 will be reestablished to cause the blank characters in the tape 12 to be idled through the tape transmitter 11. The idling of the blanks through the transmitters continues until the tape lever contacts 23 open or the directing character preceding the following message is advanced over the pins of the transmitter. When the directing character of the succeeding message is stepped over the pins of the transmitter, it effects another operation of relays 15$a$ to 15$e$ in the manner described to prepare a circuit for operation of one of the pairs of line selecting relays 16 to 19 and 16$a$ to 19$a$. Thereupon the operator may depress the key 37 to initiate transmission of this succeeding message to the proper sending position circuit.

It often happens that a plurality of messages will appear in the tape 12 and that it will be desirous to switch these messages to their proper sending position circuits automatically without the necessity of the operator actuating the key 37 to initiate the switching of each message. In this connection, a key 91 is provided in the intra-office circuit and operation thereof initiates the switching of all messages that may be in the tape 12 or which may appear therein between the time the key 91 is operated and the tape lever contacts 23 open. Operation of key 91 applies a ground through the coil of a relay 92 to potential whereby said relay is energized and locks up through its inner tongue and front contact. Operation of relay 92 applies ground from the tongue and back contact of relay 39 through tongues and back contacts of relays 21 and 38 to the fan circuit of relays 15$a$ to 15$e$ and thence to the coils of one of the pairs of line relays such as 16 and 16$a$. The operation of one of the pairs of line relays, such as 16 and 16$a$, the pair being selected by the directing character in the tape preceding the message, is effective in the manner described to initiate transmission of the message through the intra-office circuit. At the end of the message, the end-of-message signal effects operation of relay 39 which removes ground from the holding circuit of the pair of operated line switching relays, such as 16 and 16$a$, whereupon said relays release. The release of relay 16$a$ opens conductor No. 6 of cable 44 which causes the vacuum tube 47 to cease drawing plate current and thereby effect release of relay 76. Relay 76 in releasing in turn effects release of relay 82 which opens the circuit through the coil of relay 39 whereupon this relay also releases and the line selecting equipment of the intra-office circuit is restored to its normal condition, which normal condition includes the energization of relays 21 and 22. The release of relay 39 reapplies ground to the fan circuit of relays 15$a$ to 15$e$ which are operated in accordance with the directing character preceding the next message, whereupon the intra-office circuit functions in the manner described to relay the next message in the tape 12 therethrough. Relay 38 is a slow-to-release relay and therefore the circuit to the stepping magnet SM of the tape transmitter 11 will not be recompleted for a short interval of time which is sufficient to permit relay 39 to operate and release between messages.

Thus as long as messages continue to appear in the tape 12 they will automatically be switched to their proper sending position circuit as determined by the directing characters preceding each message. If messages received over the circuit cease for a period of time sufficient to permit the tape 12 to become taut and open contacts 23, the circuit to the step magnet SM of the tape transmitter 11 is interrupted through the left-hand coil of relay 123 whereupon said relay operates and through its left-hand tongue applies a ground through a back contact and tongue of relay 27 to the batteried terminal of relay 92. This causes relay 92 to release and if at this time a message is being transmitted through the intra-office circuit, further switching of messages from the tape 12 through the circuit will be halted when the relay 39 operates at the end of the message then in progress of being transmitted. If the tape lever contacts 23 open with blank tape between the reperforator 13 and the transmitter 11, subsequent messages appearing in the tape will not be transmitted until either the keys 37 or 91 are operated.

In order to prevent a message from being sent through the switching center to a line circuit, the remote office of which is closed, each sending position circuit is provided with a close-out key 62. The operation of the key 62 to open the contacts 61 thereof prevents the operating circuit to the sending position circuit seizing relay 56 from being completed. Hence, with relay 56 prevented from operating, the sending position circuit associated with an operated close-out key 62 cannot be connected to an intra-office transmitter.

If an intra-office transmitter selects a closed out sending position circuit and effects illumination of the connection request lamp 36, the operation of either key 37 or key 91 will cause operation of the proper line switching relays and the connection request lamp to be extinguished. Relays 76 and 49 will operate but relays 81 and 56 will not, and therefore the transmitter 11 will not start. In such an event, the operator could note by observing the close-out lamps such as 99, one of which is provided for each sending position circuit and which is lighted when its associated sending circuit is closed out, why the transmitter failed to start.

A message to a closed out office may be sent at times to the nearest open office through the respective sending position circuit even though the directing character preceding the message has attempted to select a closed out sending position. In such an event, the nearest open office is manually selected by the operation of a key individual to the sending position circuit associated with this open office. These keys 93 to 96, one for each pair of line switching relays, such as 16 and 16$a$, permit any one pair of the line switching relays to be operated at a time. Operation of any one of the keys, 93 to 96, completes a circuit from ground at the back contact and outer tongue of relay 38 through the coils of its associated pair of line switching relays, such as 16 and 16$a$.

Following the operation of a pair of line switching relays by the operation of a key, such as 93, the transmission of the stored message is effected in the same manner as described above where the selection of a sending position circuit is performed automatically. It will be noted that while a pair of line switching relays, such as 16 and 16$a$, may be energized by the operation of its associated key, such as 93, a locking circuit to such relays will not be established unless all the other line switching relays are deenergized. Lamps 97, one associated with each pair of line switching relays, has the circuit completed thereto when the circuit is established to its associated line switching relays. Hence, the illumination of one of the lamps 97 indicates to which sending position circuit an intra-office transmitter may be connected.

When a perforator, such as 13, is controlled from a keyboard or other appropriate unit at the local sending position of a switching center, each message sent from the local position will have immediately following the directing character thereof the call letter or designating character of the switching office. In the case of the circuit shown, "Q" is the office call letter of the switching center. Should the local operator fail to insert the directing character at the beginning of the message, the local office call letter will be the first character of a message to appear over the pins of the transmitter and as described will effect operation of relays 15a to 15e accordingly. When these relays are operated in accordance with the local office call letter, a circuit is completed from ground through the outer tongues thereof and the coil of relay 42 to potential, whereupon said relay is operated. The operation of this relay opens the described circuit which with switch 43 closed, normally effects the stepping of the message directing character out of the tape transmitter 11. Hence, with relay 42 operated, the call letter of the local office will not be advanced through the transmitter. Normally, the call letter of the local office will not be the same as the directing character of a message and therefore with relays 15a to 15e operated in response to the call letter the operation of either key 37 or 91 will not initiate the transmission of a message from the tape 11 even though the connection request lamp 36 is illuminated. In such an event, the operator may determine the destination of the message and operate the corresponding one of the keys 93 to 96 to initiate the transmission of the message to the proper sending position circuit. Since the first character of such a message will not be stepped out of the transmitter, which character will be the call letter of the local station, it will be transmitted as the first character of the message.

It will be obvious that various modifications and changes in the system, shown in the drawings and described herein, may be made without departing from the spirit or essential attributes of the invention, and it is desired therefore, that only such limitations be placed thereon as are specifically set forth in the appended claims.

What is claimed is:

1. In a telegraph system, a storage medium wherein signals representing telegraph messages are stored, a telegraph transmitter for transmitting signals stored in said medium, a plurality of telegraph transmitting circuits, switching apparatus for extending a transmitting path from said transmitter to any one of said transmitting circuits at a time, means controlled by message directing signals preceding each message stored in said medium for controlling said switching apparatus, a manually operable switch associated with said transmitter and means operative with said switch in one position to control said switching apparatus to transmit said message directing signals to transmitting circuits along with messages and with said switch in another position to transmit messages only to said transmitting circuits.

2. In a telegraph system, a storage medium having signals representing telegraph messages stored therein, a telegraph transmitter for transmitting signals stored in said medium, a plurality of telegraph transmitting circuits, switching apparatus for extending a transmitting path from said transmitter to any one of said transmitting circuits at a time, means controlled by message directing signals preceding each message stored in said medium for controlling said switching apparatus and to select transmitting circuits in accordance with the directing signals preceding each message, a manually operable element, means operative on the actuation of said element following the operation of said switching apparatus for initiating operation of said transmitter to transmit a message therefrom, and means including end-of-message signals terminating each message stored in said medium for halting operation of said transmitter after the transmission of a message therefrom.

3. In a telegraph system, a storage medium having signals representing telegraph messages stored therein, a telegraph transmitter for transmitting signals stored in said medium, a plurality of telegraph transmitting circuits, switching apparatus for extending a transmitting path from said transmitter to any one of said transmitting circuits at a time, means controlled by message directing signals preceding each message stored in said medium for controlling said switching apparatus and to select transmitting circuits in accordance with the directing signals preceding each message, a first manually operable element, means operative on the actuation of said element following the operation of said switching apparatus for initiating operation of said transmitter to transmit a message therefrom, a second manually operable element and means operative on the actuation of said element to condition said switching apparatus to successively extend a transmitting circuit from said transmitter to the transmitting circuits indicated by the directing signals stored in said medium ahead of the messages.

4. In a telegraph system, a storage medium having signals representing telegraph messages stored therein, a telegraph transmitter for transmitting signals stored in said medium, a plurality of telegraph transmitting circuits, switching apparatus for extending a transmitting path from said transmitter to any one of said transmitting circuits at a time, means controlled by message directing signals preceding each message stored in said medium for controlling said switching apparatus and to select transmission circuits in accordance with the directing signals preceding each message, a first manually operable element, means operative on the actuation of said element following the operation of said switching apparatus for initiating operation of said transmitter to transmit a message therefrom, a second manually operable element, and means operative in the actuation of said second element and including said switching apparatus to automatically transmit all the messages stored in said medium to the transmitting circuits indicated by the directing signals preceding each message stored in the medium.

5. In a telegraph message switching office, a storing device for storing telegraph messages in a storage medium, each message stored in said medium being preceded by message directing signals and terminated by end-of-message signals, a telegraph transmitter for transmitting the signals stored in said medium, a plurality of outgoing telegraph channels terminating at said office, switching apparatus for extending a transmission path from said transmitter to any one of said channels at a time, means to condition said switching apparatus to automatically establish successive paths of transmission from said transmitter to said outgoing channels under the control of the message directing signals and effect automatic transmission of said messages from said office, means to condition said switching apparatus to select only an outgoing channel in response to a directing signal preceding a message and means responsive to a manual operation to initiate the transmission of the accompanying message from said transmitter.

6. In a telegraph switching system, a storage medium, a storing device for storing messages in said medium with each of the said messages preceded by directing signals and terminated by end-of-message signals, a transmitter for transmitting signals representative of those stored in said medium, a plurality of outgoing telegraph channels, switching means for extending a transmission path from said transmitter to any one of said channels at a time, manually operable means to condition said switching means to atuomatically extend said transmission paths from said transmitter to said channels in accordance with said directing signal preceding said messages and in response to end-of-message signals to interrupt extended paths and condition said switching means to respond to following directing signals, and means to halt further automatic operation of said switching means following transmission of the next end-of-message signal after the amount of said storage medium between said storing device and said transmitter reaches a predetermined minimum.

7. In a telegraph switching system, a storage medium, a storing device for storing messages in said medium with each of the said messages preceded by directing signals and terminated by end-of-message signals, a transmitter for transmitting signals representative of those stored in said medium, a plurality of outgoing telegraph channels, switching means for extending a transmission path from said transmitter to any one of said channels at a time, manually operable means to condition said switching means to automatically extend said transmission paths from said transmitter to said channels in accordance with said directing signal preceding said messages and in response to end-of-message signals to interrupt extended paths and condition said switching means to respond to following directing signals, means to halt further automatic operation of said switching means following transmission of the next end-of-message signal after the amount of said storage medium between said storing device and said transmitter reaches a predetermined minimum, and means to delete said message directing signals from the messages transmitted to said outgoing channels.

8. In a telegraph switching system, a storage medium, a storing device for storing messages in said medium with each of the said messages preceded by directing signals and terminated by end-of-message signals, a transmitter for transmitting signals representative of those stored in said medium, a plurality of outgoing telegraph channels, switching means for extending a transmission path from said transmitter to any one of said channels at a time, manually operable means to condition said switching means to automatically extend said transmission paths from said transmitter to said channels in accordance with said directing signal preceding said messages and in response to end-of-message signals to interrupt extended paths and condition said switching means to respond to following directing signals, means to halt further automatic operation of said switching means following transmission of the next end-of-message signal after the amount of said storage medium between said storing device and said transmitter reaches a predetermined minimum, a switch, means operative with said switch in one position to condition said switching means to delete said directing signals from the messages as they are transmitted to said outgoing channels and with said switch in another position to condition said switching means whereby said directing signals are transmitted along with the messages.

WILLIAM B. BLANTON.
ROBERT C. AYERS.

REFERENCES CITED

The following references are of record in the file of this patent:

UNITED STATES PATENTS

| Number | Name | Date |
|---|---|---|
| 2,346,173 | Light | Apr. 11, 1944 |
| 2,375,383 | Potts | May 8, 1945 |
| 2,381,871 | Bacon | Aug. 14, 1945 |
| 2,392,356 | Bacon | Jan. 8, 1946 |